(12) United States Patent
Kondo et al.

(10) Patent No.: US 6,599,852 B2
(45) Date of Patent: Jul. 29, 2003

(54) OPTICAL AMPLIFYING GLASS

(75) Inventors: Yuki Kondo, Yokohama (JP); Setsuro Ito, Yokohama (JP); Naoki Sugimoto, Yokohama (JP); Tatsuo Nagashima, Yokohama (JP); Setsuhisa Tanabe, Kyoto (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/923,348

(22) Filed: Aug. 8, 2001

(65) Prior Publication Data

US 2002/0041436 A1 Apr. 11, 2002

(30) Foreign Application Priority Data

Aug. 10, 2000 (JP) ........................ 2000-242407
Nov. 17, 2000 (JP) ........................ 2000-351621

(51) Int. Cl.$^7$ .................. C03C 3/253; C03C 3/076; C03C 13/04; C03C 3/062
(52) U.S. Cl. ................. 501/42; 501/73; 501/37; 501/55
(58) Field of Search ............... 501/37, 41, 42, 501/49, 50, 53, 55, 64, 65, 73, 77, 78

(56) References Cited

U.S. PATENT DOCUMENTS 4,790,619 A * 12/1988 Lines et al. ............ 385/12
5,093,287 A * 3/1992 Borrelli et al. ......... 501/41
5,093,288 A * 3/1992 Aitken et al. .......... 501/42

OTHER PUBLICATIONS

Kasamatsu et al., 1.50–μm–band gain–shifted thuliumdoped fiber amplifier with 1.05– and 1.56–μm duaql–wavelength pumping, Dec. 1, 1999, Optics Letters, vol. 24, No. 23, 1684–1686.*
Jon Heo, Yong Beom Shin, and Joo Nyung Jang Applied Optics, vol. 34, No. 21, Jul. 20, 1995 pp. 4284–4289 Spectroscopic analysis of $Tm^{3+}$ in $PbO–Bi_2O_3–Ga_2O_3$ Glass.

* cited by examiner

Primary Examiner—David Sample
Assistant Examiner—Elizabeth A. Bolden
(74) Attorney, Agent, or Firm—Oblon, Spivak, McClelland, Maier & Neustadt, P.C.

(57) ABSTRACT

An optical amplifying glass comprising a matrix glass and from 0.001 to 10% by mass percentage of Tm doped to the matrix glass, wherein the matrix glass contains from 15 to 80 mol % of $Bi_2O_3$ and further contains at least one component selected from the group consisting of $SiO_2$, $B_2O_3$ and $GeO_2$.

7 Claims, 2 Drawing Sheets

OPTICAL AMPLIFYING GLASS

The present invention relates to an optical amplifying glass. Particularly, it relates to an optical amplifying glass capable of amplification in a broad band range for lights with wavelengths of from 1.4 to 1.5 μm.

For the purpose of application to an optical amplifier in an optical communication system, there have been research and development of an optical amplifying glass comprising a core glass and a clad glass and having a rare earth element incorporated to the core glass.

On the other hand, to cope with diversification of communication services expected in future, a wavelength division multiplexing communication system (WDM) has been proposed to increase the transmission capacity. In WDM, the transmission capacity will increase, as the number of wavelength division multiplexing channels increases.

Heretofore, an Er (erbium)-doped optical amplifying glass has been proposed as a glass suitable for optical amplification of C band (wavelength: 1,530 to 1,560 nm) or L band (wavelength: 1,570 to 1,600 nm), and a Tm (thulium)-doped optical amplifying glass has been proposed as a glass suitable for optical amplification of $S^+$ band (wavelength: 1,450 to 1,490 nm) and S band (wavelength: 1,490 to 1,530 nm).

To the Tm-doped optical amplifying glass, an excitation light is introduced together with a light to be amplified i.e. a signal light, and the signal light will be amplified by means of a stimulated emission transition of Tm. The wavelength of the excitation light is typically from 1.0 to 1.6 μm, when excitation is carried out by an upconversion method. Further, the Tm-doped optical amplifying glass is usually used in the form of a fiber.

In the Tm-doped optical amplifying glass, optical amplification of $S^+$ band is carried out by means of the stimulated emission transfer between $^3H_4$–$^3F_4$. However, below the $^3H_4$ level, there is a near level $^3H_5$ at a distance of about 4,300 cm$^{-1}$. When the phonon energy of the glass containing $Tm^{3+}$ is large, due to this level $^3H_5$, the multiphonon relaxation in the above-mentioned stimulated emission transfer, increases, and the radiation relaxation decreases, whereby the emission efficiency, accordingly, the optical amplification factor, may decrease.

As a Tm-doped optical amplifying glass, an optical amplifying glass having Tm doped to a fluoride glass (a fluoride type Tm-doped optical amplifying glass) has been proposed. The fluoride glass has a merit such that the multiphonon relaxation is less than an oxide glass. However, the glass transition point $T_g$ of the fluoride type Tm-doped optical amplifying glass is low (typically not higher than 320° C.), and it was likely to be thermally damaged, when the intensity of the excitation light was high.

Further, the Vickers hardness $H_v$ of the fluoride type Tm-doped optical amplifying glass is low (typically, 2.4 GPa), whereby it was susceptible to scratching, and when it is made into a fiber, such a scratch is likely to cause breakage.

As an optical amplifying glass having Tm doped to a fluoride glass, a Tm-doped fluoride glass ZBLAN is, for example, known which has 1.19% by mass percentage of Tm doped to a matrix glass of a composition, as represented by mol %, comprising 52.53% of $ZrF_4$, 20.20% of $BaF_2$, 3.03% of $LaF_3$, 4.04% of $AlF_3$ and 20.20% of NaF and which has a $T_g$ of 200° C., a peak wavelength of the emission spectrum of 1,452 nm and a half value thereof being 76 nm (Applied Optics, 39(27), 4,979–4,984 (2000)).

Further, as an optical amplifying glass having Tm doped to a tellurite glass, a Tm-doped terlite glass is, for example, known which has 1.23% by mass percentage of Tm doped to a matrix glass with a composition, as represented by mol %, comprising 75% of $TeO_2$, 10% of ZnO and 15% of $Na_2O$ and which has a peak wavelength of the emission spectrum of 1,458 nm and a half value width thereof being 114 nm. However, its $T_g$ is as low as 295° C. (Applied Optics, 39(27), 4,979–4,984 (2000)).

Further, a glass having 0.01%, 0.05% or 1.5% by outer mass percentage of Tm doped to a matrix glass comprising 56 mol % of PbO, 27 mol % of $Bi_2O_3$ and 17 mol % of $Ga_2O_3$ (Tm-doped PbO—$Bi_2O_3$—$Ga_2O_3$ glass) is disclosed (Applied Optics, 34(21), 4,284–4,289 (1995)).

The annealing point and the Knoop hardness of the above matrix glass are 319° C. and 2.2 GPa, respectively (Phys. Chem. Glasses, 27, 119–123 (1986)). The annealing, point may be deemed to be equal to $T_g$, and it is considered that there will be no substantial change in $T_g$ even if Tm is doped up to 1.5%. Namely, $T_g$ of the above Tm-doped PbO—$Bi_2O_3$—$Ga_2O_3$ glass is also about 320° C., whereby the above-mentioned thermal damage is likely to result.

Further, in the case of an optical glass, the Knoop hardness gives a value lower by from 0.4 to 1.3 GPa than $H_v$ (Dictionary of Glass, p. 352, published by Asakura Shoten, 1985). Accordingly, $H_v$ of the above Tm-doped PbO—$Bi_2O_3$—$Ga_2O_3$ is considered to be within a range of from 2.6 to 3.5 GPa and can not be said to be high.

It is an object of the present invention to provide an optical amplifying glass which has high $T_g$ and $H_v$ and which is capable of amplifying lights in $S^+$ band and S band.

The present invention provides an optical amplifying glass comprising a matrix glass and from 0.001 to 10% by mass percentage of Tm doped to the matrix glass, wherein the matrix glass contains from 15 to 80 mol % of $Bi_2O_3$ and further contains at least one component selected from the group consisting of $SiO_2$, $B_2O_3$ and $GeO_2$.

DESCRIPTION OF THE INVENTION

Figure 1:
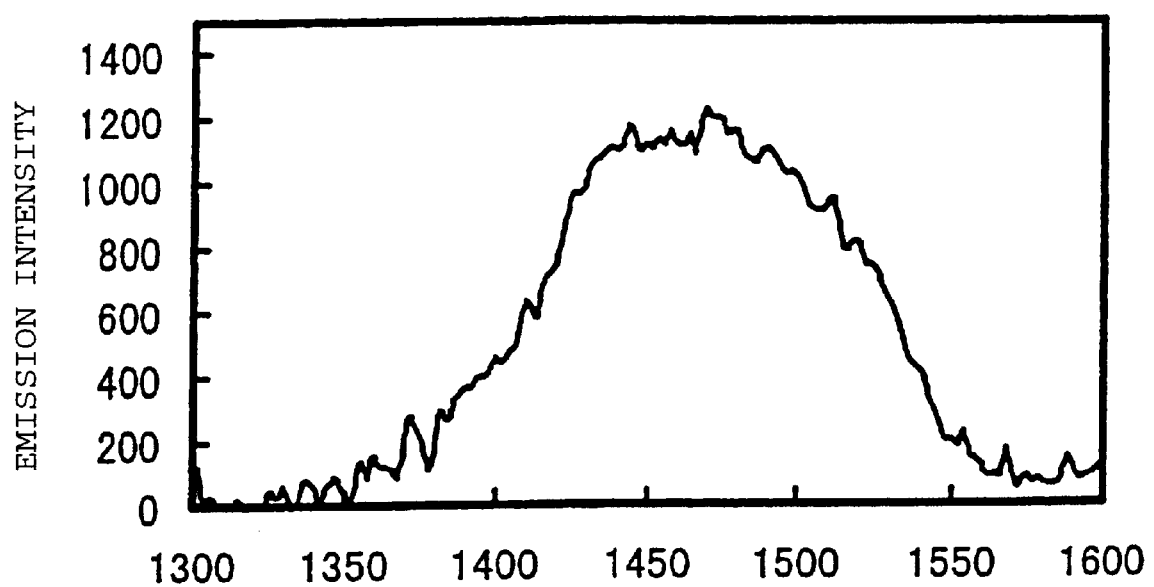
FIG. 1 is a graph showing the emission spectrum of an optical amplifying glass of the present invention.

Now, the present invention will be described in detail with reference to the preferred embodiments.

$T_g$ of the optical amplifying glass of the present invention is preferably at least 360° C. Namely, if a laser beam having a high intensity is used as the excitation light for optical amplification, the temperature of the glass tends to be locally high, and if $T_g$ is lower than 360° C., the glass is likely to be thermally damaged, and consequently, an optical loss tends to increase, and optical amplification tends to be inadequate. More preferably, $T_g$ is at least 380° C., particularly preferably at least 400° C., most preferably at least 420° C.

$H_v$ of the optical amplifying glass of the present invention is preferably at least 3.6 GPa. If it is less than 3.6 GPa, it tends to break when it is formed into a fiber. More preferably, H, is at least 3.7 GPa, particularly preferably at least 3.8 GPa, most preferably at least 4.0 GPa.

In the present invention, Tm is doped to the matrix glass in order to impart an optical amplifying function. When the matrix glass is taken as 100%, if the amount by mass percentage of Tm to be added (the Tm amount) is less than 0.001%, the optical amplification factor tends to be low. It is preferably at least 0.01%, more preferably at least 0.05%. If the amount exceeds 10%, vitrification tends to be difficult, or due to concentration quenching, the optical amplifying factor rather tends to decrease. Preferably, it is at most 1%, more preferably at most 0.5%.

Now, the matrix glass in the present invention will be described by referring to mol % simply as %.

$Bi_2O_3$ is an essential component. If its content is less than 15%, the optical amplification factor tends to decrease, or phase separation takes place. If it exceeds 80%, vitrification tends to be difficult, devitrification is likely to take place during the processing into a fiber, or $T_g$ tends to be too low.

Each of $SiO_2$, $B_2O_3$ and $GeO_2$ is a network former, and at least one of the three components must be incorporated. If none of the three components is incorporated, crystals will precipitate during the preparation of glass, and formation of the glass tends to be difficult.

In a preferred embodiment of the present invention, the matrix glass contains at least either one of $SiO_2$ and $B_2O_3$ (matrix glass A).

In another preferred embodiment of the present invention, the matrix glass contains $GeO_2$ (matrix glass B).

Firstly, matrix glass A will be described.

$Bi_2O_3$ is an essential component, as mentioned above. Its content is preferably at least 21%, more preferably at least 25%, particularly preferably at least 30%, most preferably at least 38%. Further, its content is preferably at most 70%, more preferably at most 60%, particularly preferably at most 55%, most preferably at most 48%.

The matrix glass must contain at least either one of $SiO_2$ and $B_2O_3$. Namely, it may contain only $SiO_2$ without containing $B_2O_3$, or only $B_2O_3$ without containing $SiO_2$, or it may contain both $SiO_2$ and $B_2O_3$.

The total content of $SiO_2$ and $B_2O_3$ is preferably from 5 to 75%. If the total content is less than 5%, vitrification tends to be difficult, or devitrification is likely to take place during processing into a fiber. It is preferably at least 20%, more preferably at least 25%, particularly preferably at least 30%, most preferably at least 40%. If it exceeds 75%, the optical amplification factor tends to decrease, or devitrification is likely to take place during processing into a fiber. It is more preferably at most 70%, particularly preferably at most 65%, most preferably at most 60%.

When $SiO_2$ is incorporated, its content is preferably at most 75%. If it exceeds 75%, the optical amplification factor tends to decrease, or devitrification is likely to take place during processing into a fiber. More preferably, it is at most 60%. Further, in order to facilitate vitrification, the content is preferably at most 10%.

When $B_2O_3$ is incorporated, its content is at most 75%. If it exceeds 75%, the optical amplification factor tends to decrease, or devitrification is likely to take place during processing into a fiber. More preferably, it is at most 60%. Further, to facilitate the vitrification, the content is preferably at least 15%, more preferably at least 20%.

$TeO_2$ is not essential, but may be incorporated up to 20%, as it is effective to increase the optical amplification factor. If it exceeds 20%, crystals are likely to precipitate during the preparation of glass, whereby the transmittance of glass tends to be low. Preferably, it is at most 10%, more preferably at most 5%. When $TeO_2$ is incorporated, its content is preferably at least 1%, more preferably at least 2%.

Matrix glass A preferably consists essentially of, as represented by mol % based on the following oxides:

| | |
|---|---|
| $Bi_2O_3$ | 21 to 80%, |
| $SiO_2$ | 0 to 75%, |
| $B_2O_3$ | 0 to 75%, |
| $CeO_2$ | 0 to 10%, |
| $Ga_2O_3$ | 0 to 20%, |

-continued

| | |
|---|---|
| $Al_2O_3$ | 0 to 20%, |
| $TeO_2$ | 0 to 20%, |
| $Li_2O$ | 0 to 10%, |
| $TiO_2$ | 0 to 10%, |
| $ZrO_2$ | 0 to 10%, |
| $SnO_2$ | 0 to 10%, and |
| $WO_3$ | 0 to 10%. |

$Bi_2O_3$, $SiO_2$, $B_2O_3$ and $TeO_2$ have already been explained in the foregoing, and components other than these four components will be described below.

$CeO_2$ is not essential, but may be incorporated within a range of up to 10% to suppress reduction of $Bi_2O_3$ in the glass composition during the melting of glass to precipitate metal bismuth and thereby to deteriorate the transparency of glass. If it exceeds 10%, vitrification tends to be difficult, or coloration with a yellow color or an orange color tends to be substantial, whereby the transmittance of glass tends to decrease, and a background loss at an excitation light wavelength or a signal light wavelength tends to increase. It is preferably at most 5%, more preferably at most 1%, particularly preferably at most 0.5%. When $CeO_2$ is incorporated, its content is preferably at least 0.01%, more preferably at least 0.05%, particularly preferably at least 0.1%. In a case where it is desired to avoid deterioration in the transmittance of glass, the content of $CeO_2$ is preferably less than 0.15%, and more preferably, substantially no $CeO_2$ is incorporated.

$Ga_2O_3$ is not essential, but may be incorporated up to 20% in order to increase the wavelength width in which the gain is obtainable, or in order to suppress devitrification during processing into a fiber. If it exceeds 20%, crystals tend to precipitate during the preparation of glass, whereby the transmittance of glass is likely to deteriorate. It is more preferably at most 18%, particularly preferably at most 15%, most preferably at most 10%. When $Ga_2O_3$ is incorporated, its content is preferably at least 0.1%, more preferably at least 1%, particularly preferably at least 2%.

$Al_2O_3$ is not essential, but may be incorporated up to 20% in order to suppress devitrification during processing into a fiber. If it exceeds 20%, crystals tend to precipitate during the preparation of glass, whereby the transmittance of glass is likely to deteriorate. It is more preferably at most 15%, particularly preferably at most 11%. When $Al_2O_3$ is incorporated, its content is preferably at least 0.1%, more preferably at least 1%, particularly preferably at least 2%.

The total content of $Ga_2O_3$, $Al_2O_3$ and $TeO_2$ is preferably at most 40%. If the total content exceeds 40%, a crystals tend to precipitate during the preparation of glass, whereby the transmittance of glass is likely to deteriorate. It is more preferably at most 30%, particularly preferably at most 25%, most preferably at most 20%. Further, the total content is preferably at least 2%, more preferably at least 4%.

Each of $Li_2O$, $TiO_2$, $ZrO_2$ and $SnO_2$ is not essential, but may be incorporated up to 10% in order to suppress devitrification during processing into a fiber.

$WO_3$ is not essential, but may be incorporated up to 10%, in order to increase the wavelength width in which the gain is obtainable. If it exceeds 10%, the optical amplification factor tends to deteriorate.

Matrix A as a preferred embodiment consists essentially of the above-described components, but may contain other components within a range not to impair the purpose of the present invention. For example, it may contain ZnO, MgO, CaO, SrO, BaO, $Na_2O$, $K_2O$, $Cs_2O$, $GeO_2$, CdO, PbO, $La_2O_3$, etc., in order to facilitate formation of glass or in order to suppress devitrification during processing into a fiber.

Further, as a sensitizer, $Tb_2O_3$, $Dy_2O_3$, $Ho_2O_3$, $Nd_2O_3$, $Eu_2O_3$, etc., may be incorporated. When $Tb_2O_3$, $Dy_2O_3$, $Ho_2O_3$, $Nd_2O_3$ and $Eu_2O_3$ are incorporated, the content of each component is preferably at least 0.001%, more preferably at least 0.01%, particularly preferably at least 0.1%.

Further, PbO is preferably not substantially contained, since it is likely to deteriorate the Vickers hardness.

The total content of the above-described other components is preferably at most 10%. Further, the total content of $Tb_2O_3$, $Dy_2O_3$, $Ho_2O_3$, $Nd_2O_3$ and $Eu_2O_3$ is preferably at most 2%, more preferably at most 1.5%, particularly preferably at most 1%.

Now, an embodiment of matrix glass A which contains $Na_2O$ and whereby vitrification is easy and devitrification during processing into a fiber scarcely takes place, will be described.

Firstly, such an embodiment consists essentially of, as represented by mol % based on the following oxides, from 15 to 80% of $Bi_2O_3$, from 1 to 75% of $SiO_2$, from 0 to 10% of $CeO_2$, from 0 to 25% of $Ga_2O_3$, from 0 to 10% of $Al_2O_3$ and from 1 to 9% of $Na_2O$. More preferably, it consists essentially of from 30 to 50% of $Bi_2O_3$, from 5 to 40% of $SiO_2$, from 0 to 0.5% of $CeO_2$, from 5 to 22% of $Ga_2O_3$, from 1 to 10% of $Al_2O_3$ and from 1 to 9% of $Na_2O$. The matrix glass of such an embodiment consists essentially of the above-described components, but may contain other components within a range not to impair the purpose of the present invention.

Composition Examples A1 to A4, as represented by mol %, of the matrix glass of such an embodiment, are shown in Table 1. In the Table, $T_g$ was obtained by a differential thermal analysis (unit: °C.).

TABLE 1

|  | A1 | A2 | A3 | A4 |
|---|---|---|---|---|
| $Bi_2O_3$ | 39.95 | 39.95 | 40.8 | 44.9 |
| $SiO_2$ | 29.95 | 29.95 | 34.15 | 29.95 |
| $CeO_2$ | 0.15 | 0.15 | 0.15 | 0.15 |
| $Ga_2O_3$ | 19.95 | 19.95 | 16.6 | 15.0 |
| $Al_2O_3$ | 2.5 | 5.0 | 3.3 | 5.0 |
| $Na_2O$ | 7.5 | 5.0 | 5.0 | 5.0 |
| $T_g$ | 440 | 460 | 445 | 450 |

Another embodiment of matrix glass A which contains $Na_2O$ and whereby vitrification is easy and devitrification during processing into a fiber scarcely takes place, consists essentially of, as represented by mol % based on the following oxides:

| | |
|---|---|
| $Bi_2O_3$ | 15 to 53%, |
| $SiO_2$ | 22 to 50%, |
| $CeO_2$ | 0 to 10%, |
| $Ga_2O_3$ | 15 to 35%, |
| $Al_2O_3$ | 0 to 9%, |
| $Na_2O$ | 9.1 to 20%, |
| ZnO | 0 to 4.5%, and |
| BaO | 0 to 4.5%, | wherein $Bi_2O_3/(SiO_2+Ga_2O_3)$ (hereinafter this ratio will be referred to as the $Bi_2O_3$ ratio) is from 0.30 to 0.80, and $Na_2O/(Bi_2O_3+Ga_2O_3+Al_2O_3+BaO+ZnO)$ (hereinafter this ratio will be referred to as the $Na_2O$ ratio) is from 0.15 to 0.26. The matrix glass of such an embodiment consists essentially of the above-described components, but may contain other components within a range not to impair the purpose of the present invention. Further, it is more preferred that $CeO_2$ is from 0 to 0.5%, and the $Bi_2O_3$ ratio is from 0.30 to 0.79.

Composition Examples B1 to B11, as represented by mol %, of the matrix glass of such an embodiment, will be shown in Table 2. With respect to B1 to B6, $T_g$ was obtained by DTA (unit: °C.).

TABLE 2

| | B1 | B2 | B3 | B4 | B5 | B6 | B7 | B8 | B9 | B10 | B11 |
|---|---|---|---|---|---|---|---|---|---|---|---|
| $Bi_2O_3$ | 19.95 | 22.45 | 24.95 | 24.95 | 27.85 | 29.05 | 24.96 | 24.96 | 27.46 | 29.95 | 37.75 |
| $SiO_2$ | 34.95 | 32.45 | 26.95 | 29.95 | 27.85 | 29.05 | 34.95 | 34.95 | 34.95 | 29.95 | 28.35 |
| $CeO_2$ | 0.15 | 0.15 | 0.15 | 0.15 | 0.15 | 0.15 | 0.15 | 0.15 | 0.15 | 0.15 | 0.15 |
| $Ga_2O_3$ | 19.95 | 19.95 | 19.95 | 19.95 | 18.55 | 19.35 | 24.96 | 24.96 | 24.96 | 19.95 | 18.85 |
| $Al_2O_3$ | 6.5 | 6.5 | 7.0 | 6.5 | 4.6 | 4.9 | 0 | 0 | 0 | 5.0 | 2.4 |
| $Na_2O$ | 12.5 | 12.5 | 15.0 | 12.5 | 15.0 | 12.5 | 12.48 | 12.48 | 12.48 | 10.0 | 10.0 |
| ZnO | 3.0 | 3.0 | 3.0 | 3.0 | 3.0 | 2.5 | 2.5 | 0 | 0 | 2.5 | 2.5 |
| BaO | 3.0 | 3.0 | 3.0 | 3.0 | 3.0 | 2.5 | 0 | 2.5 | 0 | 2.5 | 0 |
| $Bi_2O_3$ ratio | 0.36 | 0.43 | 0.53 | 0.50 | 0.60 | 0.60 | 0.42 | 0.42 | 0.46 | 0.60 | 0.80 |
| $Na_2O$ ratio | 0.24 | 0.23 | 0.26 | 0.22 | 0.26 | 0.21 | 0.24 | 0.24 | 0.24 | 0.17 | 0.16 |
| $T_g$ | 485 | 465 | 420 | 445 | 390 | 430 | — | — | — | 450 | 420 |

Now, matrix glass B will be described.

As mentioned above, $Bi_2O_3$ is an essential component. Its content is preferably at least 15.5%, more preferably at least 20%, still more preferably at least 25%, particularly preferably at least 30%, most preferably at least 35%. Further, its content is preferably at most 70%, more preferably at most 60%, particularly preferably at most 55%, most preferably at most 48%.

$GeO_2$ is essential. The content of $GeO_2$ is preferably from 5 to 80%. If it is less than 5%, vitrification tends to be difficult, or devitrification during processing into a fiber, is likely to take place. It is more preferably at least 15%, particularly preferably at least 20%, most preferably at least 25%. If it exceeds 80%, the optical amplification factor tends to deteriorate, or devitrification during processing into a fiber is likely to take place. It is more preferably at most 75%, particularly preferably at most 60%, most preferably at most 55%.

$Ga_2O_3$ is not essential, but may be incorporated up to 30%, in order to increase the wavelength width in which the gain is obtainable, or in order to suppress devitrification during processing into a fiber. If it exceeds 30%, crystals are likely to precipitate during the preparation of glass, whereby the transmittance of glass tends to deteriorate. It is preferably at most 25%. If $Ga_2O_3$ is incorporated, its content is preferably at least 0.5%, more preferably at least 1%, particularly preferably at least 3%, most preferably at least 5%.

$CeO_2$ is not essential, but may be incorporated up to 10% in order to suppress reduction of $Bi_2O_3$ in the glass composition during the melting of glass to precipitate metal bismuth and thereby to deteriorate the transparency of glass. If it exceeds 10%, vitrification tends to be difficult, or coloration with a yellow color or an orange color tends to be substantial, whereby the transmittance of glass tends to deteriorate, and a background loss at an excitation light wavelength or a signal light wavelength is likely to increase. It is preferably at most 1%, more preferably at most 0.5%, particularly preferably at most 0.3%. If $CeO_2$ is incorporated, its content is preferably at least 0.01%, more preferably at least 0.05%, particularly preferably at least 0.1%. Further, in a case where it is desired to avoid deterioration of the transmittance of glass, the content of $CeO_2$ is preferably made to be less than 0.15%, and more preferably, substantially no $CeO_2$ is incorporated.

It is preferred that $Ga_2O_3$ or $CeO_2$ is contained, and the total content of $Bi_2O_3$, $GeO_2$, $Ga_2O_3$ and $CeO_2$ i.e. $Bi_2O_3+GeO_2+Ga_2O_3+CeO_2$, is at least 70%.

Further, more preferably, from 15 to 48% of $Bi_2O_3$, from 15 to 60% of $GeO_2$, from 0.5 to 25% of $Ga_2O_3$, and from 0.1 to 0.3% of $CeO_2$, are incorporated. Still more preferably, from 15 to 48% of $Bi_2O_3$, from 25 to 60% of $GeO_2$, from 5 to 25% of $Ga_2O_3$ and from 0.1 to 0.3% of $CeO_2$, are incorporated.

Matrix glass B preferably consists essential of, as represented by mol % based on the following oxides:

| | |
|---|---|
| $Bi_2O_3$ | 15 to 80%, |
| $GeO_2$ | 5 to 80%, |
| $Ga_2O_3$ | 0 to 30%, |
| $CeO_2$ | 0 to 10%, |
| $WO_3$ | 0 to 10%, |
| $TeO_2$ | 0 to 20%, |
| $Al_2O_3$ | 0 to 30%, |
| $Li_2O$ | 0 to 10%, |
| $Na_2O$ | 0 to 20%, |
| $K_2O$ | 0 to 20%, |
| ZnO | 0 to 20%, |
| MgO | 0 to 20%, |
| CaO | 0 to 20%, |
| SrO | 0 to 20%, |
| BaO | 0 to 20%, |
| $TiO_2$ | 0 to 10%, |
| $ZrO_2$ | 0 to 10%, and |
| $SnO_2$ | 0 to 10%. |

$Bi_2O_3$, $GeO_2$, $Ga_2O_3$ and $CeO_2$ have been explained in the foregoing, and components other than these four components will be described below.

$WO_3$ is not essential, but may be incorporated up to 10% in order to increase the wavelength width in which the gain is obtainable. If it exceeds 10%, the optical amplification factor may deteriorate.

$TeO_2$ is not essential, but may be incorporated up to 20% in order to increase the optical amplification factor. If it exceeds 20%, crystals tend to precipitate during the preparation of glass, whereby the transmittance of glass is likely to deteriorate. It is preferably at most 10%, more preferably at most 5%. When $TeO_2$ is incorporated, its content is preferably at least 1%, more preferably at least 2%.

$Al_2O_3$ is not essential, but may be incorporated up to 30% in order to suppress devitrification during processing into a fiber. If it exceeds 30%, crystals may precipitate during the preparation of glass, whereby the transmittance of glass tends to deteriorate. It is more preferably at most 20%, particularly preferably at most 15%. When $Al_2O_3$ is incorporated, its content is preferably at least 0.1%, more preferably at least 1%, particularly preferably at least 2%.

The total content of $Ga_2O_3$, $Al_2O_3$ and $TeO_2$ is preferably at most 50%. If it exceeds 50%, crystals are likely to precipitate during the preparation of glass, whereby the transmittance of glass tends to deteriorate. It is more preferably at most 30%, particularly preferably at most 25%, most preferably at most 20%. Further, the total content is preferably at least 2%, more preferably at least 4%.

Each of $Li_2O$, $Na_2O$ and $K_2O$ is not essential, but may be incorporated up to 10%, 20% or 20%, respectively, in order to suppress devitrification during processing into a fiber.

Each of ZnO, MgO, CaO, SrO and BaO is not essential, but may be incorporated up to 20% each, in order to suppress devitrification during processing into a fiber.

Each of $TiO_2$, $ZrO_2$ and $SnO_2$ is not essential, but may be incorporated up to 10% each, in order to suppress devitrification during the processing of the fiber.

Matrix glass B as a preferred embodiment consists essentially of the above-described components, but may further contain other components within a range not to impair the purpose of the present invention. The total content of such other components is preferably at most 10%.

Such other components will be described.

In order to facilitate formation of glass, or in order to suppress devitrification during processing into a fiber, $Cs_2O$, CdO, PbO, $Y_2O_3$, $La_2O_3$, etc., may be incorporated.

As a sensitizer, $Tb_2O_3$, $Dy_2O_3$, $Ho_2O_3$, $Yb_2O_3$, etc. may be incorporated. When $Tb_2O_3$, $Dy_2O_3$, $Ho_2O_3$ or $Yb_2O_3$ is incorporated, the content of each component is preferably at least 0.001%, more preferably at least 0.01%, particularly preferably at least 0.1%.

Further, PbO is preferably not substantially contained, since it deteriorates $H_v$.

Further, $SiO_2$ or $B_2O_3$ is preferably not substantially incorporated, since it tends to increase multiphonon relaxation.

There is no particular restriction as to the method for producing the optical amplifying glass of the present invention. For example, the optical amplifying glass of the present invention can be prepared by a melting method in which the starting materials are mixed, put into a platinum crucible, a platinum-gold alloy crucible, an alumina crucible, a quartz crucible or an iridium crucible and melted at a temperature of from 800 to 1,300° C. in air, and the obtained melt (molten glass) is cast in a prescribed mold. In order to reduce the water content in glass and thereby to suppress an increase of multiphonon relaxation, the moisture in the melting atmosphere in the melting method is preferably as small as possible, and for this purpose, it is preferred to employ dry nitrogen, dry oxygen or dry air.

Further, the optical amplifying glass of the present invention may be prepared by a method other than the melting method, such as a sol/gel method or a gas-phase vapor deposition method. Further, from the optical amplifying glass of the present invention thus prepared, a preform may be prepared and formed into a fiber, or a such a glass may be formed into a fiber by a double crucible method, to obtain an optical amplifying glass fiber.

Now, the present invention will be described in further detail with reference to Examples. However, it should be understood that the present invention is by no means restricted to such specific Examples.

EXAMPLES

Glasses were prepared which had Tm doped in the amounts shown in Table 3 by mass percentage in the line for Tm, to matrix glasses (each of them being matrix glass A) having the compositions shown by mol % in the lines for from $Bi_2O_3$ to $TeO_2$ in Table 3. $T_g$ obtained by DTA is shown in Table 3 (unit: ° C.). Further, with respect to Example 2, $H_v$ is also shown (unit: MPa).

With respect to the glass of Example 1, light having a wavelength of 800 nm was irradiated by means of a semiconductor laser diode (output: 1W), and the emission spectrum at a wavelength of from 1,300 to 1,600 nm was measured by using PbS as a detector. The results are shown in FIG. 1, with the emission intensity being of an arbitrary unit. In the vicinity of a wavelength of 1,470 nm, the emission peak (the half value width: about 120 nm) attributable to the transition of Tm from $^3H_4$ to $^3F_4$, was observed. Accordingly, optical amplification of the $S^+$ band (wavelength: 1,450 to 1,490 nm) and the S band (wavelength: 1,490 to 1,530 nm) is, for example, possible by an upconversion method.

TABLE 3

|  | Ex. 1 | Ex. 2 | Ex. 3 | Ex. 4 |
|---|---|---|---|---|
| $Bi_2O_3$ | 42.9 | 42.8 | 42.9 | 42.9 |
| $SiO_2$ | 35.9 | 14.3 | 56.9 | 32.1 |
| $B_2O_3$ | — | 28.5 | — | — |
| $CeO_2$ | 0.2 | 0.2 | 0.2 | — |
| $Ga_2O_3$ | 17.5 | 7.1 | — | 17.9 |
| $Al_2O_3$ | 3.5 | 7.1 | — | 3.6 |
| $TeO_2$ | — | — | — | 3.5 |
| Tm | 0.2 | 0.06 | 0.12 | 0.05 |
| $T_g$ | 475 | 430 | 453 | 470 |
| $H_v$ | — | 4.3 | — | — |

Further, glasses were prepared which had Tm doped in the amounts shown in Tables 4 to 7 by mass percentage in the line for Tm, to matrix glasses (each of them being matrix glass B) having the compositions represented by molar ratio in the lines for from $Bi_2O_3$ to BaO in Tables 4 to 7. $T_g$ obtained by DTA, and the crystallization initiation temperature $T_x$ are shown in the Tables (unit: ° C.). Further, with respect to Examples 11 and 15, $H_v$ is also shown (unit: MPa).

Here, $T_x$ is the temperature at which the heat generation peak accompanying crystallization, starts to rise, and an index temperature for initiation of crystallization.

$T_x$–$T_g$ is preferably at least 50° C. If it is less than 50° C., devitrification during processing into a fiber is likely to take place. It is more preferably at least 70° C., particularly preferably at least 130° C., most preferably at least 150° C.

Figure 2:
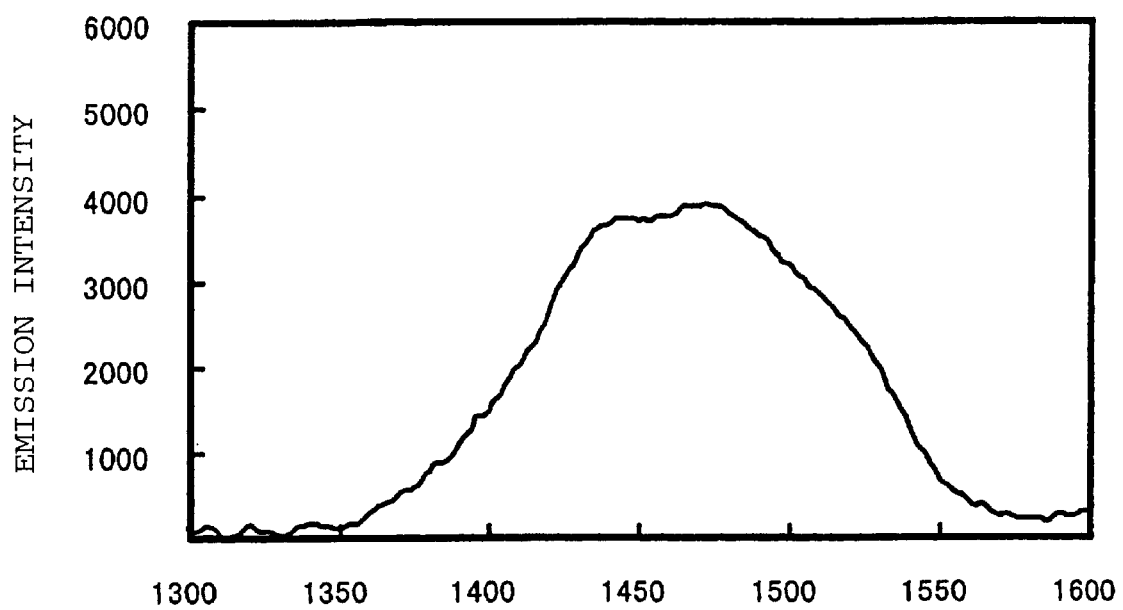
FIG. 2 is a graph showing the emission spectrum of an optical amplifying glass according to another embodiment of the present invention.

Further, with respect to the glass of Example 11, in the same manner as for the glass of Example 1, the emission spectrum at a wavelength of from 1,300 to 1,600 nm, was measured. The results are shown in FIG. 2, with the emission intensity being of an arbitrary unit. The emission peak (the half value width: 122 nm) attributable to the transfer of Tm from $^3H_4$ to $^3F_4$ was observed in the vicinity of a wavelength of 1,470 nm. Accordingly, as mentioned above with respect to the glass of Example 1, light amplification of the $S^+$ band and the S band is possible.

Further, the half value width $\Delta\lambda$ is 122 nm, and the wavelength width in which the gain is obtainable, is larger than the conventional Tm-incorporated glass, and it is excellent as an optical amplifying glass. Also with respect to Examples 12 to 15, 20 to 23 and 34, $\Delta\lambda$ was measured in the same manner. The results are shown in the Tables (unit: nm).

TABLE 4

|  | Ex.11 | Ex.12 | Ex.13 | Ex.14 | Ex.15 | Ex.16 |
|---|---|---|---|---|---|---|
| $Bi_2O_3$ | 42.8 | 32.2 | 36.5 | 38.6 | 32.2 | 20.2 |
| $GeO_2$ | 35.6 | 26.95 | 30.55 | 32.35 | 26.95 | 34.45 |
| $Ga_2O_3$ | 21.4 | 15.7 | 17.8 | 18.9 | 15.7 | 9.8 |
| $CeO_2$ | 0.2 | 0.15 | 0.15 | 0.15 | 0.15 | 0.15 |
| $Al_2O_3$ | — | — | — | — | — | — |
| $Na_2O$ | — | — | — | — | 2.5 | 9.8 |
| $K_2O$ | — | 5.0 | 3.0 | 2.0 | 2.5 | 10.0 |
| ZnO | — | 10.0 | 6.0 | 4.0 | 10.0 | 4.8 |
| MgO | — | — | — | — | — | 1.3 |

TABLE 4-continued

|  | Ex.11 | Ex.12 | Ex.13 | Ex.14 | Ex.15 | Ex.16 |
|---|---|---|---|---|---|---|
| CaO | — | — | — | — | — | — |
| SrO | — | — | — | — | — | — |
| BaO | — | 10.0 | 6.0 | 4.0 | 10.0 | 9.5 |
| Tm | 0.22 | 0.06 | 0.1 | 0.05 | 0.1 | 0.1 |
| $T_g$ | 470 | 430 | 440 | 440 | 425 | 380 |
| $T_x$ | 540 | 575 | 540 | 540 | 580 | 485 |
| $T_x - T_g$ | 70 | 145 | 100 | 100 | 155 | 105 |
| $H_v$ | 4.0 | — | — | — | 3.7 | — |
| $\Delta\lambda$ | 122 | 126 | 124 | 120 | 134 | — |

TABLE 5

|  | Ex.17 | Ex.18 | Ex.19 | Ex.20 | Ex.21 | Ex.22 |
|---|---|---|---|---|---|---|
| $Bi_2O_3$ | 20.0 | 21.35 | 21.35 | 15.95 | 28.55 | 15.95 |
| $GeO_2$ | 25.95 | 67.15 | 72.05 | 50.35 | 59.95 | 46.65 |
| $Ga_2O_3$ | 3.0 | 5.35 | 6.45 | 8.55 | 5.35 | 12.25 |
| $CeO_2$ | 0.15 | 0.15 | 0.15 | 0.15 | 0.15 | 0.15 |
| $Al_2O_3$ | 8.9 | 6.0 | — | — | 6.0 | — |
| $Na_2O$ | 13.2 | — | — | — | — | — |
| $K_2O$ | — | — | — | 5.0 | — | 5.0 |
| ZnO | 4.7 | — | — | 10.0 | — | 10.0 |
| MgO | 0.4 | — | — | — | — | — |
| CaO | 9.1 | — | — | — | — | — |
| SrO | 7.8 | — | — | — | — | — |
| BaO | 6.8 | — | — | 10.0 | — | 10.0 |
| Tm | 0.1 | 0.1 | 0.1 | 0.1 | 0.1 | 0.1 |
| $T_g$ | 420 | 510 | 480 | 485 | 505 | 490 |
| $T_x$ | 470 | 650 | 620 | 615 | 640 | 645 |
| $T_x - T_g$ | 50 | 140 | 140 | 130 | 135 | 155 |
| $H_v$ | — | — | — | — | — | — |
| $\Delta\lambda$ | — | — | — | 134 | 118 | 133 |

TABLE 6

|  | Ex.23 | Ex.24 | Ex.25 | Ex.26 | Ex.27 | Ex.28 |
|---|---|---|---|---|---|---|
| $Bi_2O_3$ | 32.2 | 37.45 | 32.2 | 32.2 | 36.9 | 31.3 |
| $GeO_2$ | 26.95 | 21.7 | 26.95 | 21.95 | 16.95 | 26.17 |
| $Ga_2O_3$ | 15.7 | 15.7 | 12.2 | 15.7 | 16.0 | 15.24 |
| $CeO_2$ | 0.15 | 0.15 | 0.15 | 0.15 | 0.15 | 0.15 |
| $Al_2O_3$ | — | — | 3.5 | — | — | — |
| $Na_2O$ | 5.0 | — | — | — | — | 2.42 |
| $K_2O$ | — | 5.0 | 5.0 | 6.0 | 6.0 | 2.42 |
| ZnO | 10.0 | 10.0 | 10.0 | 12.0 | 12.0 | 9.7 |
| $TiO_2$ | — | — | — | — | — | 2.9 |
| BaO | 10.0 | 10.0 | 10.0 | 12.0 | 12.0 | 9.7 |
| Tm | 0.1 | 0.1 | 0.1 | 0.1 | 0.1 | 0.1 |
| $\Delta\lambda$ | 124 | — | — | — | — | — |
| $T_g$ | 430 | 410 | 425 | 425 | 400 | — |
| $T_x$ | 575 | 580 | 570 | 580 | 550 | — |
| $T_x - T_g$ | 145 | 170 | 145 | 155 | 150 | — |

TABLE 7

|  | Ex.29 | Ex.30 | Ex.31 | Ex.32 | Ex.33 | Ex.34 |
|---|---|---|---|---|---|---|
| $Bi_2O_3$ | 31.3 | 31.88 | 31.88 | 33.25 | 21.35 | 21.35 |
| $GeO_2$ | 26.17 | 26.69 | 26.69 | 27.84 | 72.0 | 44.94 |
| $Ga_2O_3$ | 15.24 | 15.57 | 15.57 | 13.0 | 0.5 | 8.6 |
| $CeO_2$ | 0.15 | 0.15 | 0.15 | 0.15 | 0.15 | 0.15 |
| $Al_2O_3$ | — | — | — | — | 6.0 | — |
| $Na_2O$ | 2.42 | 2.47 | 2.47 | 2.58 | — | — |
| $K_2O$ | 2.42 | 2.47 | 2.47 | 2.58 | — | 5.0 |
| ZnO | 9.70 | 9.89 | 9.89 | 10.3 | — | 9.98 |
| $TiO_2$ | — | — | — | — | — | — |
| $ZrO_2$ | — | 0.99 | — | — | — | — |
| $La_2O_3$ | 2.9 | — | 0.99 | — | — | — |
| BaO | 9.7 | 9.89 | 9.89 | 10.3 | — | 9.98 |
| Tm | 0.1 | 0.1 | 0.1 | 0.1 | 0.1 | 0.06 |

TABLE 7-continued

|   | Ex.29 | Ex.30 | Ex.31 | Ex.32 | Ex.33 | Ex.34 |
|---|---|---|---|---|---|---|
| Δλ | — | — | — | — | — | 136 |
| $T_g$ | 440 | 430 | 430 | 420 | 490 | 470 |
| $T_x$ | 615 | 580 | 680 | 575 | 640 | 575 |
| $T_x - T_g$ | 175 | 150 | 200 | 155 | 150 | 105 |

According to the present invention, it is possible to obtain an optical amplifying glass which scarcely undergoes a thermal damage even when a laser beam having a high intensity is used as an excitation light, which scarcely breaks even when formed into a fiber and whereby optical amplification of the S$^+$band and the S band is possible, and the wavelength width in which the gain is obtainable, is large, whereby transmission of information of a large capacity by a wavelength division multiplexing transmission system will be possible also with the S$^+$band and the S band.

The entire disclosures of Japanese Patent Application No. 2000-242407 filed on Aug. 10, 2000 and Japanese Patent Application No. 2000-351621 filed on Nov. 17, 2000 including specifications, claims, drawings and summaries are incorporated herein by reference in their entireties.

What is claimed is:

1. An optical amplifying glass comprising a matrix glass and from 0.001 to 10% by mass percentage of Tm doped to the matrix glass,
    wherein the matrix glass consists essentially of, as represented by mol % based on the following oxides:

| | |
|---|---|
| $Bi_2O_3$ | 15 to 80%, |
| $SiO_2$ | 1 to 75%, |
| $CeO_2$ | 0 to 10%, |
| $Ga_2O_3$ | 0 to 25%, |
| $Al_2O_3$ | 0 to 10%, and |
| $Na_2O$ | 1 to 9%. |

2. An optical amplifying glass comprising a matrix glass and from 0.001 to 10% by mass percentage of Tm doped to the matrix glass,
    wherein the matrix glass consists essentially of, as represented by mol % based on the following oxides:

| | |
|---|---|
| $Bi_2O_3$ | 15 to 53%, |
| $SiO_2$ | 22 to 50%, |
| $CeO_2$ | 0 to 10%, |
| $Ga_2O_3$ | 15 to 35%, |
| $Al_2O_3$ | 0 to 9%, |
| $Na_2O$ | 9.1 to 20%, |
| ZnO | 0 to 4.5%, and |
| BaO | 0 to 4.5%, | wherein $Bi_2O_3/(SiO_2+Ga_2O_3)$ is from 0.30 to 0.80, and $Na_2O/(Bi_2O_3+Ga_2O_3+Al_2O_3+BaO+ZnO)$ is from 0.15 to 0.26.

3. An optical amplifying glass comprising a matrix glass and from 0.001 to 10% by mass percentage of Tm doped to the matrix glass,
    wherein the matrix glass contains from 15 to 48 mol % of $Bi_2O_3$, from 15 to 60 mol % of $GeO_2$, from 0.5 to 25 mol % of $Ga_2O_3$ and from 0.1 to 0.3 mol % of $CeO_2$.

4. The official amplifying glass according to claim 3, which has a glass transition point of at least 360° C.

5. The optical amplifying glass according to claim 3, which has a Vickers hardness of at least 3.6 Gpa.

6. An optical amplifying glass comprising a matrix glass and from 0.001 to 10% by mass percentage of Tm doped to the matrix glass,
    wherein the matrix glass consists essentially of, as represented by mol % based on the following oxides:

| | |
|---|---|
| $Bi_2O_3$ | 15 to 48%, |
| $GeO_2$ | 15 to 60%, |
| $Ga_2O_3$ | 0.5 to 25%, |
| $CeO_2$ | 0.1 to 0.3%, |
| $WO_3$ | 0 to 10%, |
| $TeO_2$ | 0 to 20%, |
| $Al_2O_3$ | 0 to 30%, |
| $Li_2O$ | 0 to 10%, |
| $Na_2O$ | 0 to 20%, |
| $K_2O$ | 0 to 20%, |
| ZnO | 0 to 20%, |
| MgO | 0 to 20%, |
| CaO | 0 to 20%, |
| SrO | 0 to 20%, |
| BaO | 0 to 20%, |
| $TiO_2$ | 0 to 10%, |
| $ZrO_2$ | 0 to 10%, and |
| $SnO_2$ | 0 to 10%. |

7. An optical amplifying glass comprising a matrix glass and from 0.001 to 10% by mass percentage of Tm doped to the matrix glass,
    wherein the matrix glass consists essentially of, as represented by mol % based on the following oxides:

| | |
|---|---|
| $Bi_2O_3$ | 15 to 48%, |
| $GeO_2$ | 5 to 60%, |
| $Ga_2O_3$ | 0.5 to 25%, |
| $CeO_2$ | 0.1 to 0.3%, |
| $WO_3$ | 0 to 10%, |
| $TeO_2$ | 0 to 20%, |
| $Al_2O_3$ | 0 to 30%, |
| $Li_2O$ | 0 to 10%, |
| $Na_2O$ | 0 to 20%, |
| $K_2O$ | 0 to 20%, |
| ZnO | 0 to 20%, |
| MgO | 0 to 20%, |
| CaO | 0 to 20%, |
| SrO | 0 to 20%, |
| BaO | 0 to 20%, |
| $TiO_2$ | 0 to 10%, |
| $ZrO_2$ | 0 to 10%, and |
| $SnO_2$ | 0 to 10%, | and wherein $Bi_2O_3+GeO_2+Ga_2O_3+CeO_2$ is at least 70 mol %.

* * * * *